Feb. 18, 1930.　　　E. O. McCULLY　　　1,747,380
ANIMAL TRAP
Filed March 6, 1928
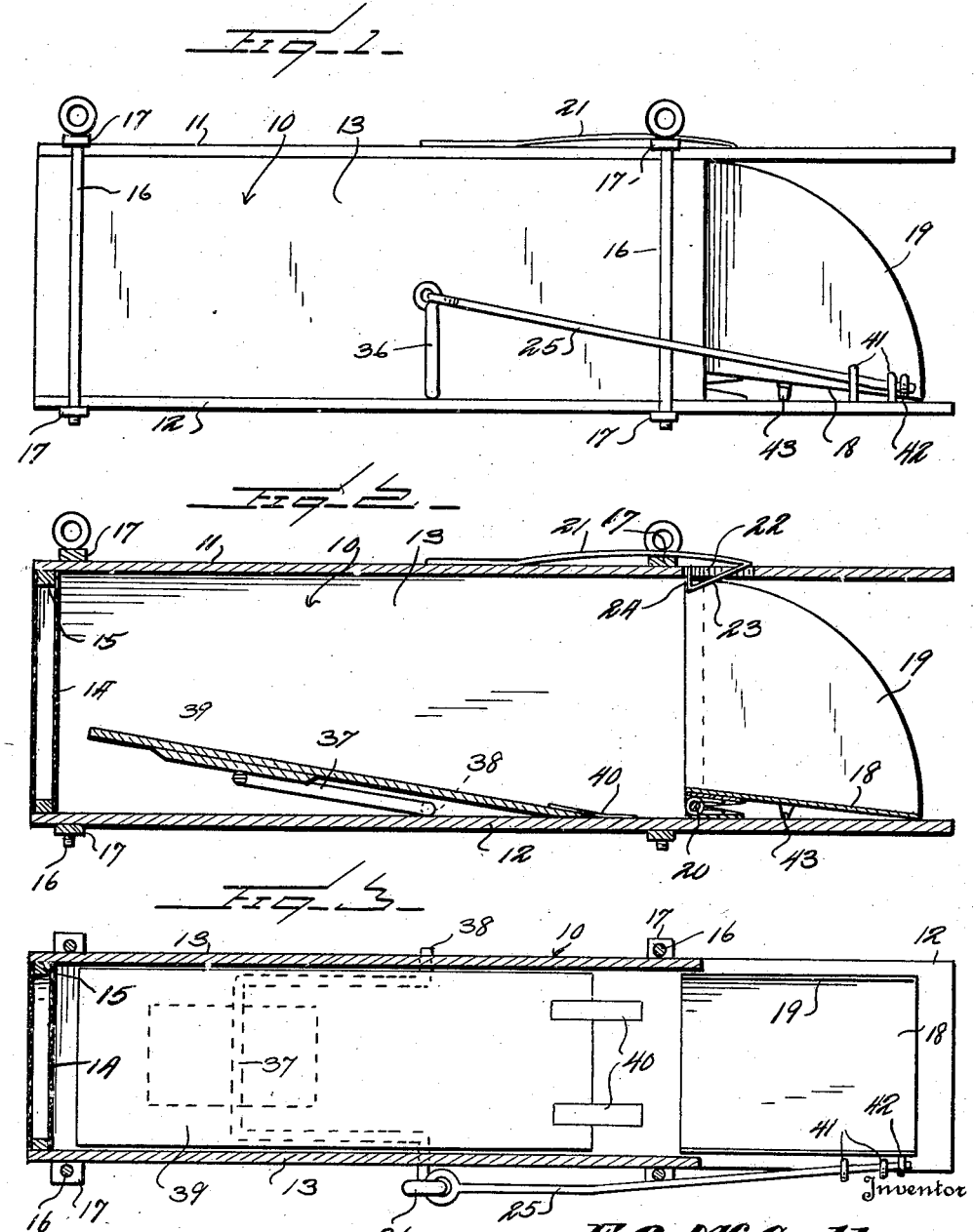

Patented Feb. 18, 1930

1,747,380

UNITED STATES PATENT OFFICE

ERNEST O. McCULLY, OF KALISPELL, MONTANA

ANIMAL TRAP

Application filed March 6, 1928. Serial No. 259,526.

This invention relates to animal traps of that class in which a box or casing is provided closed at one end and having a door at the other, the door being urged by a spring to a closed position, and an animal-actuated latch being provided for releasing the door.

The general object of the present invention is to provide an animal trap of this character which is so constructed that the door, when open, extends downward in an approximately horizontal position to form a runway for the animal, the door being provided with wings preventing the animal from catching his leg or tail between the door and the sides of the box.

A further object is to provide a latching device of a very simple character disposed, except for the trip, entirely upon the exterior of the box, and which is so constructed that it may be adjusted so that the latch will be either heavy or light.

A still further object is to so construct a trap of this character that it may be readily collapsed into a flat condition for transportation or readily set up.

Other objects will appear in the course of the following description.

My invention is illustrated in the accompanying drawing, wherein:—

Figure 1 is a side elevation of a trap constructed in accordance with my invention;

Figure 2 is a longitudinal vertical section thereof;

Figure 3 is a horizontal longitudinal section thereof.

Referring to this drawing, 10 designates a box or casing which is rectangular in cross section and may have any desired length. This box or casing is formed with a top 11, bottom 12, the side walls 13, and an end wall 14 which is preferably double and formed of wire netting disposed in a frame 15. These parts are held together by clamping bolts 16 passing through transverse bars 17 of metal in the manner shown, the bars 17 engaging across the top and bottom of the trap and the bolts 16 extending down at the sides of the trap. This construction makes it a very easy matter to disassemble the trap for packing or to quickly put it together and this construction has further advantages which will be later pointed out.

The top 11 extends beyond the sides 13, as does the bottom 12, so that the overhanging top forms a projection under which animals are likely to crawl for protection against the weather. Hingedly connected to the bottom 12 is the door 18 having the sector-shaped wings 19 which may be made of sheet metal. The door may be made of sheet metal or of wood or any other suitable material. The hinge 20 whereby the door is connected to the floor is a spring hinge and may be of ordinary construction and one or more hinges may be used, as desired, depending upon the size of the trap, and the strength of the spring will also depend somewhat upon the size of the trap. The action of the spring is to close the door and when the door is closed, that is, when the door is in a vertical position, it is held closed by a spring latch, designated generally 21, this latch having a portion extending down through a slot 22 in the top of the trap and formed with a detent 23, this detent being beveled upon its forward face to permit the door to pass it and lift the spring latch but at its inner end having a straight portion or shoulder 24 engaging behind the door when the door is closed and preventing the door from being again opened by the animal inside.

For the purpose of latching the door in its lowered position to receive an animal, I provide the latch rod or bolt 25. This bolt at its inner end is flexibly connected to an arm 36 of a trip 37. This trip 37 is upwardly curved or slightly crank-shaped within the box and ordinarily is disposed as close to the floor 12 as possible, the other end 38 of the trip extending out through an opening in the box so that thus the trip is pivotally mounted. Resting upon this trip is the platform 39 which may be supported by means of hinges or straps 40 attached to the floor. This trip plate or platform 39 rests upon the crank 37 and when an animal enters the box and steps upon its trip plate, the trip will be pressed, arm 36 will be withdrawn, and the bolt 25 will be retracted. The bolt 25 at its forward end passes through a guide eye 41 mounted upon the projecting portion of the floor 12 and through an eye or eyes 42 projecting laterally from the door 18. When the bolt is projected through said eyes, it is obvious that the door cannot move upward, but the second that the bolt is retracted beyond the eye 42, the door will be released and will promptly close with considerable violence.

No bait holder is provided, though one can be secured if necessary, as the bait for this trap will be simply thrown into the interior of the trap, of course beyond the trip plate 39, or the trap may be filled with materials such as used by animals for making nests so that an animal will enter the trap in order to pass the night and will operate the trip plate and be caught. The door is provided with a handle 43 whereby the door may be opened. When it is desired to open the door and re-set the trip, the latch 21 is pulled upward and the door pulled downward to its horizontal position and the latch inserted in the eye 42. The trap is then ready for use.

It will be seen that this trap may be shipped or carried in a collapsed condition and may be very readily set up without the necessity of using any tools except a nail or screw-driver for turning the bolts. It permits a trapper to haul a large number of traps in a car or boat or sled. Furthermore, if a relatively large animal is caught in the trap which would ordinarily necessitate the breaking up of the trap in order to get the animal, the trap may be readily disassembeld by loosening the bolts and the animal taken therefrom.

When the trap is set, the appearance of the trap is very neat and the animal can easily crawl up on top and from there can see into the trap and get acquainted with the trap. As a matter of fact, animals are more likely to crawl on the top of the trap and look in than they are from any other point, I have found in long experience. The door, instead of being raised in the air, which tends to prevent the animal from looking in, is lowered to the floor so that the animal can readily look into the interior of the trap either while on top or on the ground. The wire screen permits light to get into the interior of the trap so that the animal can see into the trap. The fenders or wings 19 I have found particularly valuable for the reason that they prevent the door from catching on the tail or foot of the animal and thereby injuring the animal and possibly leaving the door open. By making the door open downward into a horizontal position, the traps do not have to be made so large and there is no danger of the door injuring the animal. When a door drops, as in other traps known to me, the animal is likely to jump back and in many cases gets under the door. This cannot happen with my trap. By placing the trigger or trip arm at the side of the trap, there is less danger of the trip arm being operated than there is when the trip arm is placed on the top of the trap, as many animals climb on top of a trap to look in. It will be particularly noted that the trigger can be set either light or heavy by inserting it a greater or less distance into the eye 42. The less the trigger is inserted in the eye 42, the quicker the trap will operate or the lighter the pressure required to operate it.

Obviously many changes might be made in the details of construction and arrangement of parts without departing from the spirit of the invention as defined in the appended claims.

I claim:—

1. A trap of the character described comprising a box or casing rectangular in cross section, a door hinged to the bottom at one end of the box and adapted to close this end of the box, a spring urging the door to a closed position, a latch permitting the movement of the door to a closed position but preventing the opening of the door, trip means for latching the door in an open position comprising a longitudinally shiftable bolt, a guide on the bottom of the box through which the bolt passes, an eye on the door into which the bolt is adapted to project when the door is opened, and a trip mounted within the box rearward of the door and having a crank arm extending outward of the box and operatively engaged with said bolt.

2. A trap of the character described comprising a box rectangular in cross section having a panel at one end through which light may pass, a door hinged upon the bottom of the box and disposed at the end remote from said last named end, a spring urging the door to a closed position, a spring latch holding the door when it is in closed position from being opened, trip means for latching the door in its open position against the bottom of the box comprising a pivoted trip member disposed within the box and having an arm extending radially therefrom upon the exterior of the box, a bolt flexibly connected to said arm, a guide eye on the floor beyond the sides of the box through which said bolt slides, and an eye projecting laterally from the free end of the door into which said bolt is adapted to be projected.

3. A trap having a bottom, sides and top, the bottom and top extending at one end beyond the sides, the trap having a closure at the other end, a door hinged to the bottom of the trap at a point closely adjacent the ends of the sides, the door being urged to a closed position by a spring, sector shaped wings carried by the door on each side thereof and having a radius equal to the height of the door, a latch yielding to permit the passage of the door to a closed position and latching the door from rearward movement when closed, means for locking the door in a lowered position against the bottom, and a trip disposed within the interior of the trap and adapted to release said locking means when actuated by an animal to permit the door to close.

In testimony whereof I hereunto affix my signature.

E. O. McCULLY.